United States Patent
Kazuno

(10) Patent No.: US 7,536,928 B2
(45) Date of Patent: May 26, 2009

(54) BALL SCREW

(75) Inventor: Keisuke Kazuno, Iwata (JP)

(73) Assignee: NTN Corporation (JP)

( * ) Notice: Subject to any disclaimer, the term of this patent is extended or adjusted under 35 U.S.C. 154(b) by 413 days.

(21) Appl. No.: 11/455,296

(22) Filed: Jun. 16, 2006

(65) Prior Publication Data

US 2007/0000342 A1 Jan. 4, 2007

(30) Foreign Application Priority Data

Jun. 16, 2005 (JP) .............................. 2005-176503

(51) Int. Cl.
*F16H 1/18* (2006.01)
(52) U.S. Cl. ................. 74/424.75; 74/424.86; 74/89.42
(58) Field of Classification Search ................ 74/89.23, 74/89.42, 424.71, 424.75, 424.86, 424.87; 384/516
See application file for complete search history.

(56) References Cited

U.S. PATENT DOCUMENTS

| | | | | |
|---|---|---|---|---|
| 4,474,073 A | * | 10/1984 | Blaurock et al. | 74/424.82 |
| 4,680,982 A | * | 7/1987 | Wilke et al. | 74/424.75 |
| 6,722,223 B2 | * | 4/2004 | Kanda et al. | 74/424.82 |
| 6,792,822 B2 | * | 9/2004 | Ninomiya | 74/424.82 |
| 6,925,900 B2 | * | 8/2005 | Ohkubo | 74/424.82 |
| 6,978,693 B2 | * | 12/2005 | Ohkubo | 74/424.87 |
| 6,993,992 B2 | * | 2/2006 | Kanda et al. | 74/424.88 |
| 7,363,835 B2 | * | 4/2008 | Ohkubo et al. | 74/424.86 |
| 7,390,241 B2 | * | 6/2008 | Kajita | 451/52 |

FOREIGN PATENT DOCUMENTS

JP 2004-169740 6/2004

* cited by examiner

*Primary Examiner*—David M Fenstermacher
(74) *Attorney, Agent, or Firm*—Harness, Dickey & Pierce, P.L.C.

(57) ABSTRACT

A ball screw, which improves its durability under circumstances where a radial load and a moment load are applied to it, has a screw shaft (2) formed with a helical screw groove (2a) on its outer circumferential surface. A nut (3) is adapted to mate with the screw shaft (2). The nut (3) is formed with a helical screw groove (3a) on its inner circumferential surface. The nut helical screw groove (3a) corresponds to the screw shaft screw groove (2a). A number of balls (4) are rollably contained within a ball rolling passage formed by the oppositely arranged screw grooves (2a, 3a). Bridge members (5), each formed with a connecting groove (5a) on its inner circumferential surface, connect the screw grooves (3a) of the nut (3). A contact angle (α) between each ball (4) and one or both the screw grooves (2a, 3a) is set within a range of about 20~40°.

4 Claims, 4 Drawing Sheets

(a)

(b)

(c)

PRIOR ART ary BALL SCREW

CROSS-REFERENCE TO RELATED APPLICATION

This application claims priority to Japanese Patent Application No. 2005-176503, filed Jun. 16, 2005, which application is herein expressly incorporated by reference.

FIELD

The present disclosure relates to a ball screw with a helical screw groove which enables rolling of a large number of balls and, more particularly, to a ball screw which not only receives a thrust load but an applied radial and moment load.

BACKGROUND

In general, ball screws are mechanical elements that convert a rotation of a screw shaft or nut into an axial translation of a mechanical part. The ball screw includes a screw shaft formed with a helical screw groove on its outer circumferential surface. A nut is formed with a helical screw groove on its inner circumferential surface. A number of balls are rollably contained within a ball rolling passage formed by the oppositely arranged screw grooves. In general, ball screws used for industrial machines and positioning mechanisms have a structure that mainly supports only a pure thrust load. Accordingly, radial loads and moment loads are directly applied to a nut and a screw shaft in such a ball screw. For example, when these ball screws are solely used without using any linear guide, other structural parts are used separately from the ball screw due to a caused imbalance in the inside supporting load distribution.

However, it is common in ball screws used in automobile actuators that a compound load, including thrust loads, radial loads and moment loads, is applied to the ball screw to correspond to requirements of structural limitations in the actuator to reduce its size and manufacturing cost. One example of this includes an actuator used for a variable valve mechanism and a transmission of an engine.

It is believed that the durability of the ball screw is appreciably reduced due to an increase in the contacting surface pressure caused by unevenness of inside load distribution of ball screw. Thus, the number of loading balls is reduced when a compound load, which includes radial and moment loads, other than a pure thrust load is applied to the ball screw. A representative ball screw is shown in FIG. 5.

The ball screw 51 has a screw shaft 52 with a helical screw groove 54 formed on its outer circumferential surface. A nut 53 is formed with a helical screw groove 55 on its inner circumferential surface corresponding to the screw groove 54. A number of balls 56 are rollably contained within a ball rolling passage formed by the oppositely arranged screw grooves 54, 55. Bridge members 57 connect the screw grooves 55 of the nut 53. Since the bridge members 57 are arranged at opposite ends of the nut 53, so that they are inclined at about 90° toward the circumferential direction relative to a direction along which the moment load is generated, it is possible to eliminate balls being arranged at the axially central portion of the nut 53. Thus, it is possible to reduce the manufacturing cost of the ball screw and to improve its durability due to an increase of the load supporting capacity of both the radial and moment loads of the ball screw 51 (see Japanese Laid-open Patent Publication No. 169740/2004).

Although the ball screw 51 of the prior art is effective when the directions of the generated radial load and moment load are constant, it is believed that when plural directions of the generated radial load and moment load exist or when the ball screw 51 is used in a manner so that the nut 53 is rotated not only the effect cannot be expected but the durability is reduced.

SUMMARY

It is an object of the present disclosure to provide a ball screw which can solve the problems of the prior art. The ball screw can improve its durability under circumstances where a radial load and a moment load are applied to the ball screw.

According to the present disclosure, a ball screw comprises a screw shaft formed with a helical screw groove on its outer circumferential surface. A nut is adapted to mate with the screw shaft. The screw shaft is formed with a helical screw groove on its inner circumferential surface. The helical screw groove corresponds to the screw groove of the screw shaft. A number of balls are rollably contained within a ball rolling passage formed by the oppositely arranged screw grooves. Bridge members, each formed with a connecting groove on its inner circumferential surface, connect the screw grooves of the nut. A contact angle, between the ball and the screw groove, is set within a range of 20~40°.

Since the contact angle between the ball and the screw groove is set within a range of 20~40°, the load distribution of balls within the ball screw is uniform in the driving portion of an automobile actuator where a compound load, comprising a radial load and a moment other than pure thrust load, is applied to the ball screw. Thus, it is possible to improve the durability due to a reduction of the contact surface pressure of each ball.

Preferably, the outer diameter of each ball is set within 75~110% of the lead of the ball screw. This prevents a reduction of the loading capacity in the thrust load.

Preferably, the groove depth of the screw groove is set at 35% or less than the outer diameter of the ball. This substantially elongates the length of the land portion of the screw groove. Thus, it is possible to reduce the rotational torque of the ball screw, the size of a driving motor and its power consumption.

Preferably, the ball screw is used for a driving portion of an automobile actuator. This improves the durability of the actuator due to the improvement of the life time of ball screw.

According to a ball screw of the present disclosure, since it comprises a screw shaft with a helical screw groove formed on its outer circumferential surface; a nut adapted to mate with the screw shaft, the nut formed with a helical groove on its inner circumferential surface with the nut helical screw groove corresponding to the screw groove of the screw shaft; a number of balls rollably contained within a ball rolling passage formed opposite to the arranged screw grooves; and bridge members, each formed with a connecting groove on its inner circumferential surface, to connect the screw grooves of the nut; and a contact angle between the ball and the screw groove set within a range of 20~40°, the load distribution of the balls within the ball screw is made uniform in the driving portion of an automobile actuator where a compound load, comprising a radial load and a moment other than a pure thrust load, is applied to the ball screw. Thus, it is possible to improve its durability due to a reduction of the contact surface pressure of each ball.

A ball screw comprises a screw shaft formed with a helical screw groove on its outer circumferential surface. A nut is adapted to mate with the screw shaft. The nut is formed with a helical groove on its inner circumferential surface. The nut helical screw groove corresponds to the screw shaft screw groove. A number of balls are rollably contained within a ball rolling passage formed by the oppositely arranged screw grooves. Bridge members, each formed with a connecting groove on its inner circumferential surface, connect the screw grooves of the nut. A contact angle, between the ball and the screw groove, is set within a range of 20~40°. The outer diameter of the ball is set within a range of 75~80% of the lead of the screw groove. The groove depth of the screw groove is set at 35% or less than the outer diameter of the ball.

Further areas of applicability will become apparent from the description provided herein. It should be understood that the description and specific examples are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

Figure 4:
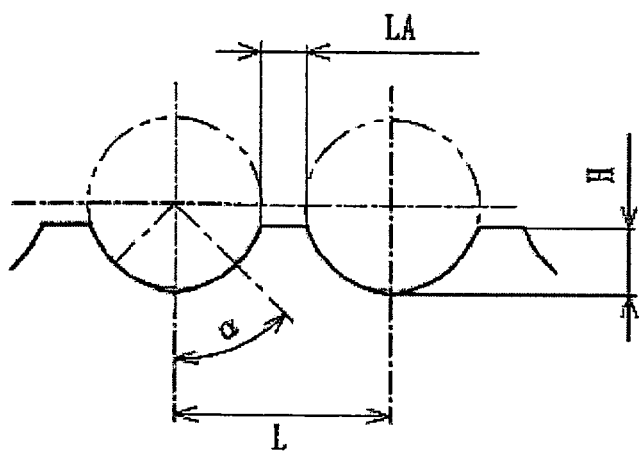
FIG. 4(a) is an explanatory view of a configuration of a groove portion of the ball screw where the contact angle is 45° and the groove depth is 40% of the ball diameter.
Figure 4:
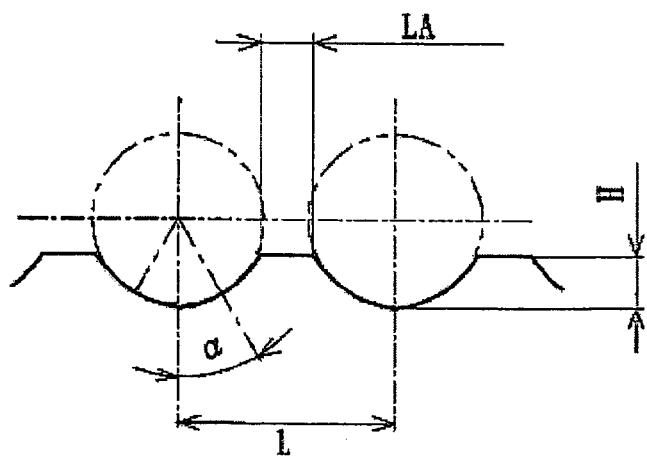
Figure 4:
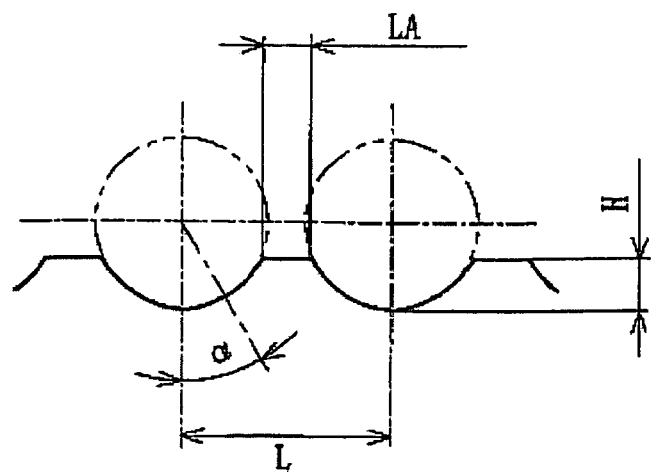
Figure 5:
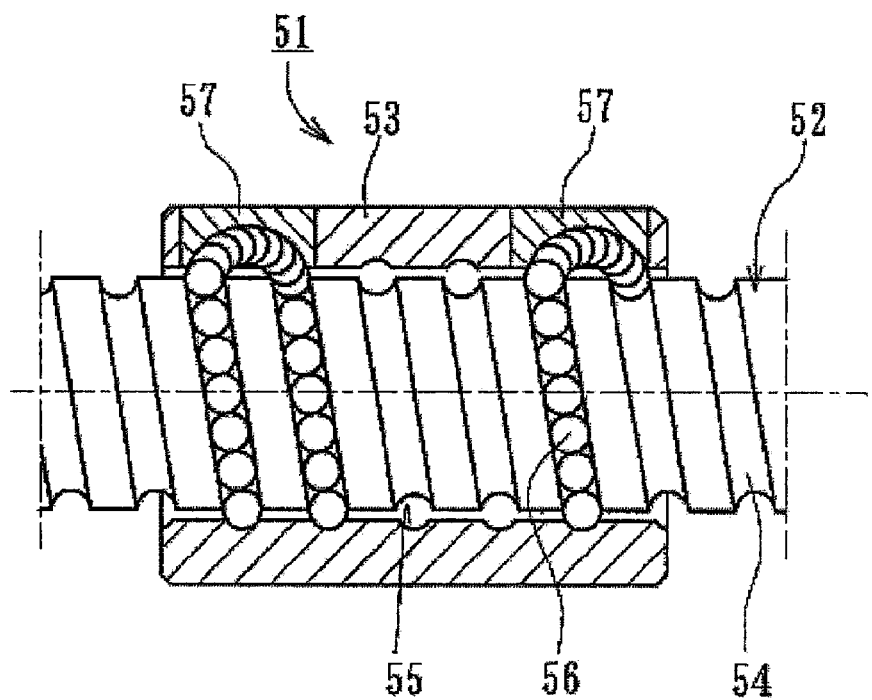

FIG. 4(b) is an explanatory view of a configuration of a groove portion of the ball screw where the contact angle is 30° and the groove depth is 30% of the ball diameter; and FIG. 4(c) is an explanatory view of a configuration of a groove portion of the ball screw where the contact angle is 30°, the groove depth is 31% of the ball diameter and the lead is the same as that of the ball screw having a contact angle of 45°; and FIG. 5 is a cross-section view of a prior art ball screw.

DETAILED DESCRIPTION

Preferred embodiments of the present disclosure will be described with reference to the accompanying drawings.

FIG. 1(a) is a front elevation view of a ball screw of the present disclosure. FIG. 1(b) is a longitudinal section view of the ball screw of FIG. 1(a).

The ball screw 1 comprises a screw shaft 2 formed with a helical screw groove 2a on its outer circumferential surface. A nut 3 is adapted to mate with the screw shaft 2. The nut 3 is formed with a helical screw 3a on its inner circumferential surface. The nut helical screw groove 3a corresponds to the screw groove 2a of the screw shaft 2. A number of balls 4 are rollably contained within a ball rolling passage formed by the oppositely arranged screw grooves (2a, 3a). Bridge members 5 are adapted to be fit onto the barrel of the nut 3. The bridge members 5 are each formed with a connecting groove 5a on their inner circumferential surface to connect the screw grooves 3a of the nut 3. A ball rolling passage is formed by the screw grooves 2a, 3a. The number of balls 4 is endlessly circulated through the connecting groove 5a of the bridge members 5.

Each of the screw grooves 2a, 3a has a Gothic arch cross-section formed by a combination of two circular arcs. Each arc has a radius of curvature slightly larger than that of the ball 4. The screw grooves 2a, 3a can be formed to have a circular arc, where the ball 4 contacts the circular surface, other than the Gothic arch configuration.

A pair of cylindrical trunnion 6 are arranged on the nut 3. The trunnions 6 oppositely extend from the outer circumferential surface of the nut 3 perpendicular to its axis. The trunnions 6 are inserted into a housing (not shown) to prevent rotation of the nut 3. Thus, the ball screw 1 is swingably supported around the axis of the trunnions 6.

The depth of the bridge member connecting groove 5a is set so that the balls 4 can climb over the land portions 2b of the screw shaft screw grooves 2a. In addition, the bridge member 5 is designed so that a non-loading region is formed within the bridge member 5 while keeping a ball rolling space within the bridge member 5.

In general, in a ball screw used in an actuator for a vehicle, the contact angle between the ball and the screw shaft is set at about 45°. However in this embodiment, the contact angle is set so that it is shifted toward the bottom side. That is, the contact angle is set within a range of about 20~40° so as to have a higher loading capacity relative to a radial load. It is possible to make the loading distribution of balls 4, within the ball screw 1, uniform and thus to improve the ball screw 1 due to a reduction of the contact surface pressure of each ball 4 by setting the contact angle smaller than that of the prior art.

The shift of the contact angle of the ball 4 toward the groove bottom can be easily achieved by only modifying the groove configuration of a roll die used to roll the screw shaft 2 and by modifying the tip configuration of a tapping tool used to tap the nut 3.

In this embodiment, the reduction of the loading capacity is prevented by increasing the outer diameter of the ball 4 since the loading capacity relative to the thrust load is reduced if the contact angle of the ball 4 is reduced. Usually, the ball diameter in such a ball screw is set within a range of about 65~70% of the lead of the screw groove. This is due to a return tube being used for the ball circulating mechanism. That is, in the ball screw of the return tube type, according to the fact that the number of circulation turns is usually set at 1.5~3.5 turns, the balls are continuously contained within adjacent screw grooves. These screw grooves and the return tube have to be arranged to keep a suitable space therebetween. Thus, it is inevitable to use a ball with a diameter of 65~70% of the lead of the screw groove.

According to this embodiment, since the bridge type is adopted as the ball circulating mechanism, the number of circulation turns becomes 1 or less. Thus, it is unnecessary to continuously contain balls 4 within adjacent screw grooves 3a. Accordingly, it is possible to set the outer diameter of ball 4 larger than that of the prior art. In this embodiment, the ball diameter is set within a range of about 75~110% of the lead of the screw groove.

Figure 2:
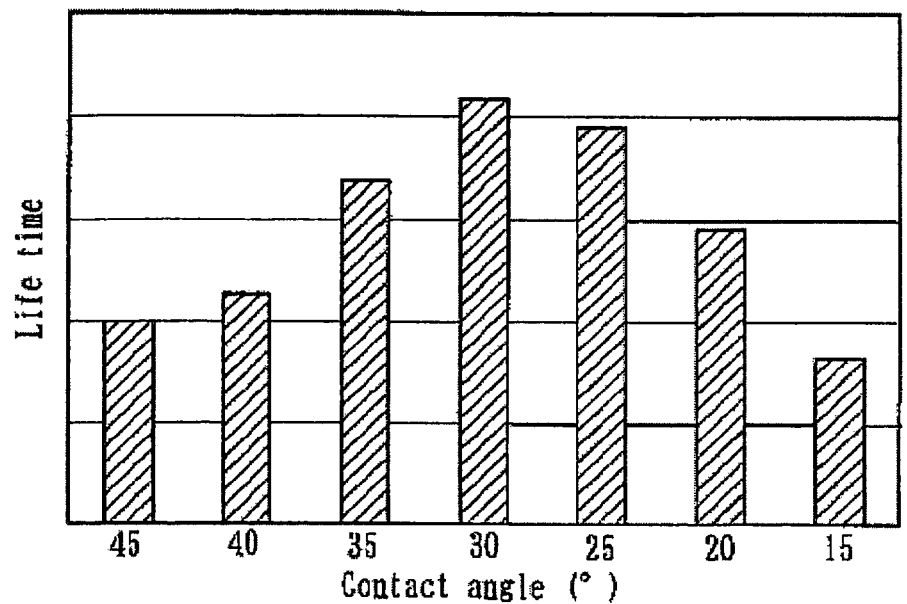
FIG. 2 is a schematic view of a graph showing the relationship between the contact angle and the life time of a ball screw of the bridge type.

FIG. 2 is a graph showing results of the life time of a ball screw of the prior art, a ball screw of the bridge type with a contact angle of 45° obtained by calculating the life time while gradually reducing the contact angle. This calculation was carried out by using a ball screw having the following specifications; a diameter of a screw shaft of 15 mm, a lead of the screw groove of 3.5 mm, a number of the circulation rows of 2, a diameter of the ball of 2.381 mm (corresponding to 68% of the lead of the screw groove), and a radial gap of 0.015 mm. Loading conditions were 200 N both in a radial load Fr and a thrust load Fa.

It has been found that the life time of the ball screw can be improved 1.1~2.1 times that of the prior art within a range of the contact angle of 20~40° under conditions where a compound load, of a radial load Fr and a thrust load Fa, is applied to the ball screw. However, it has also been found that the life time is reduced 0.8 times the prior art when the contact angle is less than 15°.

Figure 1:
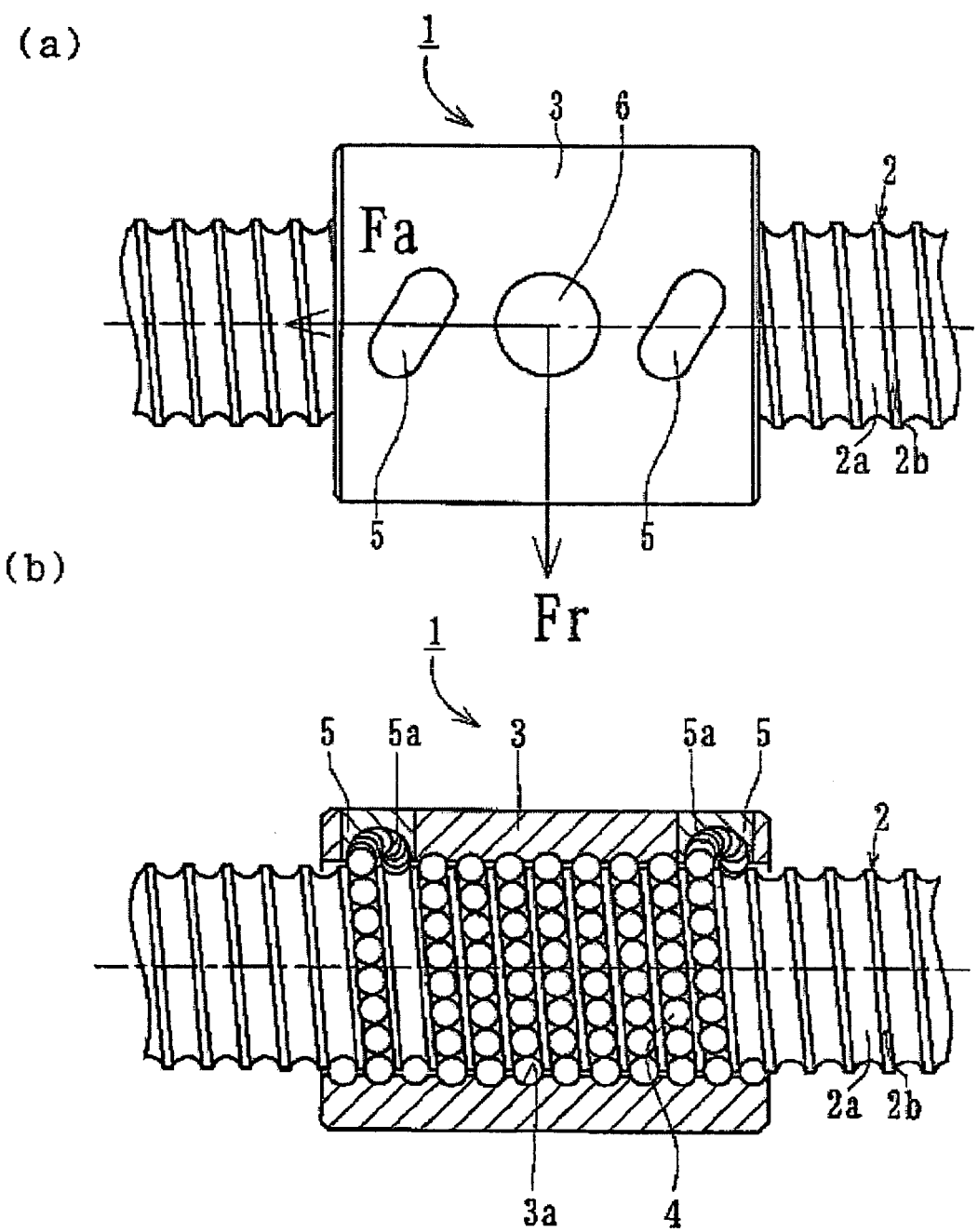
FIG. 1(a) is a front elevation view of a ball screw of the present disclosure.
FIG. 1(b) is a longitudinal section view of the ball screw of FIG. 1(a)
Figure 3:
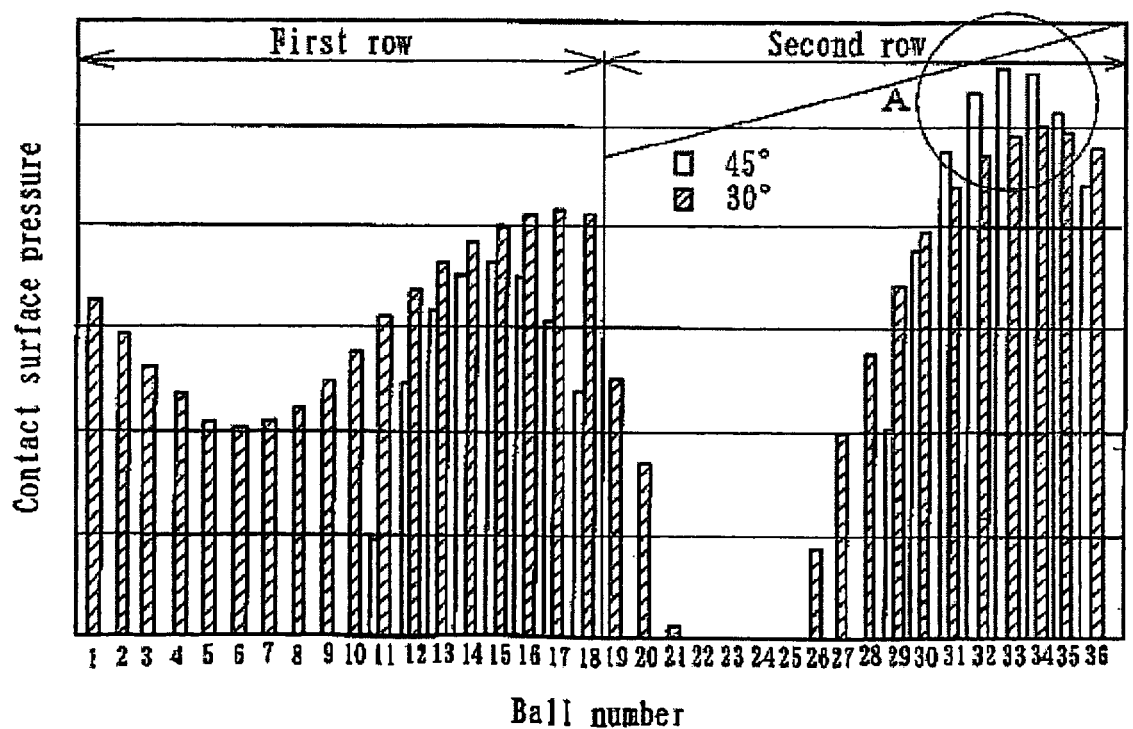
FIG. 3 is a schematic view of a graph showing the contact surface pressure generated in a ball of a ball screw of the bridge type, respectively, in cases of the contact angle at 45° and 30°.

FIG. 3 is a graph showing the contact surface of the ball screw having a contact angle of 45° and that of the ball screw having a contact angle 30°, which exhibited most excellent result in the life time calculation as shown in FIG. 2. It can be appreciated that the load distribution of the balls is made more uniform in the ball screw having a contact angle of 30° than the one having a contact angle of 45° under working conditions where a compound load, the radial load Fr and the thrust load Fa, is applied to the ball screw. It is supposed that the displacement of the nut due to elastic deformation of the ball will cause a balancing effect against the applied load. That is, as shown in FIG. 1, since the nut 3 is displaced downward against the radial load Fr and is balanced with the applied load, the balls 4 contacting the screw groove 3a and supporting the load are collected in the upper side of the nut 3. The balls 4 in the lower side occupy a non-contact condition and thus do not support any load. However, since the contact points of balls 4 are shifted toward the groove bottom by setting the contact angle to a smaller angle of 30° from 45°, the amount of elastic displacement of the balls 4 downward of the nut 3 is reduced. Accordingly, the number of balls 4 contacting the screw groove 3a, the number of the loaded balls 4, is increased. As can be seen from the calculated results shown in FIG. 3, it is found that all the balls 4 of the first row (ball number 1~18) occupy the contacted condition and the number of the loaded balls 4 are also increase in the second row (ball number 19~36).

In addition, it will be found that the loading capacity relative to the radial load Fr is also increased in addition to the increase in the number of loaded balls 4. Thus, the maximum contact surface pressure (shown by "A" in FIG. 3) is reduced. The reduction of the maximum contact surface pressure can increase the life time of the ball screw 1 and thus improves the durability of the actuator.

FIG. 4(a) shows a configuration in a longitudinal section of the groove of a ball screw. In this example, when the ball diameter is 2.381 mm, if setting the contact angle $\alpha=45°$, the lead L=3 mm, and the groove depth H=40% of the ball diameter, as in a ball screw of the prior art, the length LA of the land portion becomes 0.64 mm. On the contrary, as shown in FIG. 4(b), when the lead L is 3 mm as is conventional, the length LA of the land portion becomes 0.74 mm and is thus increased by 0.1 mm over that of the prior art by setting the contact angle $\alpha=30°$, and the groove depth H=31% of the ball diameter.

As shown in FIG. 4(c), when the length LA of the land portion is 0.64 mm as is conventional, the lead L becomes 2.9 mm and thus is increased by 0.1 mm over that of the prior art by setting the contact angle $\alpha=30°$, and the groove depth H=31% of the ball diameter. That is, it is possible to reduce the groove depth H (the height of the groove shoulder relative to the groove bottom) by setting the contact angle $\alpha$ small. Also, it is possible to reduce the lead L by setting the length LA of the land portion the same as that of the prior art.

In this case, it is possible to describe the relationship between the thrust load Fa applied to the ball screw and the rotational torque T generated on the ball screw as $T=Fa\cdot L/2\pi\eta$. As can be seen from this formula, the rotational torque T generated on the ball screw is proportional to the lead L. "$\eta$" is the efficiency of the ball screw. If $\eta$ is about 0.9, the rotational torque T can be reduced by about 3.5% due to the reduction of the lead L from 3 mm to 2.9 mm. Accordingly, the reduction of the lead L enables a reduction of the rotational torque T applied to the actuator by the load, the size of motor and the power consumption. In addition, it is possible to reduce the number of working steps and working resistance as well as the manufacturing cost of the ball screw by setting a small groove depth.

The ball screw of the present disclosure can be applied to a driving portion of a vehicle actuator.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A ball screw comprising:
   a screw shaft formed with a helical screw groove on its outer circumferential surface;
   a nut adapted to mate with the screw shaft, said nut formed with a helical screw groove on its inner circumferential surface, said nut helical screw groove corresponding to the screw shaft screw groove;
   a number of balls rollably contained within a ball rolling passage formed by oppositely arranged screw grooves; and
   bridge members, each formed with a connecting groove on its inner circumferential surface, for connecting the nut screw grooves; and
   a contact angle between the ball and the screw groove is set within a range of about 20~40°.

2. The ball screw of claim 1 wherein the outer diameter of each ball is set within 75~110% of the lead of the ball screw.

3. The ball screw of claim 1 wherein the groove depth of the screw groove is set at 35% or less than the outer diameter of the ball.

4. The ball screw of claim 1 wherein it is used for a driving portion of an actuator for an automobile.

* * * * *